(12) United States Patent
Chang (10) Patent No.: US 10,057,014 B2
(45) Date of Patent: Aug. 21, 2018

(54) SYSTEM AND METHOD FOR STREAMING DATA

(71) Applicant: GOOGLE INC., Mountain View, CA (US)

(72) Inventor: Chuo-Ling Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 272 days.

(21) Appl. No.: 14/285,489

(22) Filed: May 22, 2014

(65) Prior Publication Data

US 2014/0351638 A1    Nov. 27, 2014

Related U.S. Application Data (60) Provisional application No. 61/826,360, filed on May 22, 2013.

(51) Int. Cl.
| | |
|---|---|
| *G06F 11/14* | (2006.01) |
| *H04L 1/08* | (2006.01) |
| *H04L 1/00* | (2006.01) |
| *H04L 12/825* | (2013.01) |
| *H04L 12/24* | (2006.01) |
| *H04L 12/811* | (2013.01) |

(52) U.S. Cl.
CPC .............. *H04L 1/08* (2013.01); *H04L 1/0002* (2013.01); *H04L 1/0015* (2013.01); *G06F 11/1402* (2013.01); *H04L 41/083* (2013.01); *H04L 41/0896* (2013.01); *H04L 47/25* (2013.01); *H04L 47/263* (2013.01); *H04L 47/38* (2013.01)

(58) Field of Classification Search
CPC ................. H04L 41/08; H04L 41/0803; H04L 41/0823–41/0836; H04L 41/0896; H04L 47/00; H04L 47/25; H04L 47/263; H04L 47/27; H04L 47/36; H04L 47/365; H04L 47/38; H04L 43/02–43/024; H04L 43/0876–43/0894; H04L 1/0001; H04L 1/0002; H04L 1/0009; H04L 1/0015; H04L 1/08; G06F 11/085; G06F 11/14; G06F 11/1402; G06F 11/1443; G06F 11/1415; G06F 11/1458; G06F 11/1465
See application file for complete search history.

(56) References Cited

U.S. PATENT DOCUMENTS

| | | | | |
|---|---|---|---|---|
| 2006/0029065 A1* | 2/2006 | Fellman | ................. | H04L 1/004 370/389 |
| 2006/0198325 A1* | 9/2006 | Gao | ...................... | H04L 1/0057 370/270 |
| 2006/0280205 A1* | 12/2006 | Cho | ...................... | H04L 1/0009 370/473 |

(Continued)

*Primary Examiner* — Albert Decady
*Assistant Examiner* — Christian Dorman
(74) *Attorney, Agent, or Firm* — Brake Hughes Bellermann LLP (57) ABSTRACT

In a system and method for streaming data, the system includes: instructions that: encode a data stream at a first bitrate; transmit a plurality of first data blocks to a receiver, each of the first data blocks including: a first source packet corresponding to the encoded data stream; and a first repair packet; and transmit a plurality of second data blocks to the receiver for a first predetermined period of time, each of the second data blocks including: a second source packet corresponding to the encoded data stream; a second repair packet; and a probing packet.

18 Claims, 7 Drawing Sheets

(56) References Cited

U.S. PATENT DOCUMENTS

| | | | | |
|---|---|---|---|---|
| 2007/0115814 A1* | 5/2007 | Gerla | H04L 1/0002 | 370/230 |
| 2008/0117930 A1* | 5/2008 | Chakareski | H04L 47/10 | 370/465 |
| 2009/0164657 A1* | 6/2009 | Li | H04L 41/0896 | 709/233 |
| 2010/0121974 A1* | 5/2010 | Einarsson | H04L 47/10 | 709/231 |
| 2010/0195521 A1* | 8/2010 | Wanstedt | H04L 47/10 | 370/252 |
| 2010/0198980 A1* | 8/2010 | Astrom | H04L 1/0014 | 709/231 |
| 2011/0179455 A1* | 7/2011 | Thompson | H04L 47/10 | 725/82 |

* cited by examiner

SYSTEM AND METHOD FOR STREAMING DATA

CROSS-REFERENCE TO RELATED APPLICATION(S)

The present application claims priority to and the benefit of U.S. Provisional Patent Application No. 61/826,360, filed May 22, 2013, the entire contents of which are hereby incorporated by reference herein.

FIELD

Aspects of embodiments of the present invention generally relate to a system and method for streaming data.

BACKGROUND

Streaming of bandwidth intensive content like movies, videos, videoconferencing and video games has become common. One goal when streaming content is to deliver the content data to a receiving user-end device continuously and at a regular and predictable rate in order to sustain an uninterrupted experience for the user. In order to accomplish this, streaming systems use various techniques to adapt to changing bandwidths, network congestion and latency between the end points of a streaming session. Such streaming systems, however, are often inefficient in terms of data storage and computational resources, or otherwise may result in inefficient use of available bandwidth or lead to relatively high instances of data packet loss.

SUMMARY

Aspects of embodiments of the present invention include a system and method for delivery of live content via interactive streaming.

According to embodiments of the present invention, in a system for streaming data, the system includes: a processor; a memory coupled to the processor, wherein the memory has stored thereon instructions that, when executed by the processor, cause the processor to: encode a data stream at a first bitrate; transmit a plurality of first data blocks to a receiver, each of the first data blocks including: a first source packet corresponding to the encoded data stream; and a first repair packet for reconstructing the encoded data stream in response to the first source packet being lost during transmission of a corresponding one of the first data blocks; receive a bitrate upgrade request from the receiver; and transmit a plurality of second data blocks to the receiver for a first predetermined period of time, each of the second data blocks including: a second source packet corresponding to the encoded data stream; a second repair packet for reconstructing the encoded data stream in response to the source packet being lost during transmission of a corresponding one of the second data blocks; and a probing packet for reconstructing the encoded data stream in response to the second source packet being lost during transmission of the corresponding one of the second data blocks.

The instructions may further cause the processor to resume transmission of the first data blocks to the receiver in response to receiving a bitrate downgrade request from the receiver during the first predetermined period of time.

The instructions may further cause the processor to encode the data stream at a second bitrate greater than the first bitrate in response to not receiving a bitrate downgrade request from the receiver during the first predetermined period of time.

The instructions may further cause the processor to transmit a plurality of third data blocks to the receiver, each of the third data blocks including a third source packet corresponding to the data stream encoded at the second bitrate.

The probing packet may include a repetition of repair data of the second repair packet.

The probing packet may include a third repair packet, which may include repair data, different from repair data of the second repair packet, for reconstructing the encoded data stream in response to the second source packet being lost during transmission of the corresponding one of the second data blocks.

The probing packet may include a third repair packet, which may include repair data, different from repair data of the second repair packet, for reconstructing the encoded data stream in response to the second source packet being lost during transmission of the corresponding one of the second data blocks, wherein the third repair packet further includes filler data appended to the repair data.

The instructions may further cause the processor to: receive, at the receiver, the first data blocks; determine whether or not any packets of the first data blocks were lost during a second predetermined period of time; and transmit the bitrate upgrade request in response to determining that none of the source packets were lost during the second predetermined period of time.

The instructions may further cause the processor to: initiate a probation period; determine whether or not any of the packets of the second data blocks were lost during the probation period.

The instructions may further cause the processor to: transmit a bitrate downgrade request in response to determining that one of the packets of the second data blocks was lost during the probation period.

According to embodiments of the present invention, in a method for streaming data, the method including: encoding, by a processor, a data stream at a first bitrate; transmitting, by the p a plurality of first data blocks to a receiver, each of the first data blocks including: a first source packet corresponding to the encoded data stream; and a first repair packet for reconstructing the encoded data stream in response to the first source packet being lost during transmission of a corresponding one of the first data blocks; receiving, by the processor, a bitrate upgrade request from the receiver; and transmitting, by the processor, a plurality of second data blocks to the receiver for a first predetermined period of time, each of the second data blocks including: a second source packet corresponding to the encoded data stream; a second repair packet for reconstructing the encoded data stream in response to the source packet being lost during transmission of a corresponding one of the second data blocks; and a probing packet for reconstructing the encoded data stream in response to the second source packet being lost during transmission of the corresponding one of the second data blocks.

The method may further include resuming transmission, by the processor, of the first data blocks to the receiver in response to receiving a bitrate downgrade request from the receiver during the first predetermined period of time.

The method may further include encoding, by the processor, the data stream at a second bitrate greater than the first bitrate in response to not receiving a bitrate downgrade request from the receiver during the first predetermined period of time.

The method may further include transmitting, by the processor, a plurality of third data blocks to the receiver, each of the third data blocks including a third source packet corresponding to the data stream encoded at the second bitrate.

The probing packet may include a repetition of repair data of the second repair packet.

The probing packet may include a third repair packet, which may include repair data, different from repair data of the second repair packet, for reconstructing the encoded data stream in response to the second source packet being lost during transmission of the corresponding one of the second data blocks.

The probing packet may include a third repair packet, which may include repair data, different from repair data of the second repair packet, for reconstructing the encoded data stream in response to the second source packet being lost during transmission of the corresponding one of the second data blocks, wherein the third repair packet further includes filler data appended to the repair data.

The method may further include receiving, by the processor, at the receiver, the first data blocks; determining, by the processor, whether or not any packets of the first data blocks were lost during a second predetermined period of time; and transmitting, by the processor, the bitrate upgrade request in response to determining that none of the source packets were lost during the second predetermined period of time.

The method may further include initiating, by the processor, a probation period; and determining, by the processor, whether or not any of the packets of the second data blocks were lost during the probation period.

The method may further include transmitting, by the processor, a bitrate downgrade request in response to determining that one of the packets of the second data blocks was lost during the probation period.

BRIEF DESCRIPTION OF THE DRAWINGS

A more complete appreciation of the present invention, and many of the attendant features and aspects thereof will become more readily apparent as the invention becomes better understood by reference to the following detailed description when considered in conjunction with the accompanying drawings in which like reference symbols indicate like components, wherein.

DETAILED DESCRIPTION

Aspects of example embodiments of the present invention relate to a system and method for the delivery of live content via interactive streaming.

For example, aspects of example embodiments of the present invention may enable relatively efficient delivery of live content via interactive streaming with low-latency, high-interactivity, non-buffered content delivery and with optimized content bitrate through the use of:

A bandwidth estimation method for live streaming that uses forward error correction (FEC) repair packets as probing traffic sent concurrently with existing content traffic to minimize the impact on the quality of the streaming content; and A system that incorporates this probing bandwidth estimation method to enable interactive streaming for low-latency, non-buffered, highly-interactive streaming applications.

Embodiments of the present invention include a computer system and method that can interactively stream live content between participating systems in such a way that provides non-buffered, low-latency, high-interactivity delivery with the addition of bandwidth monitoring and content bitrate adjustment without substantial negative impacts on the regular and continuous flow of content in interactive streaming applications. Depending on the interactive streaming application, a particular computing system can be the sender, the receiver, or both.

The types of techniques that can be employed to adapt the content load to the available bandwidth in order to maintain a good user experience may vary according to the type of streaming application, for example, adaptive streaming and interactive streaming.

Adaptive streaming techniques may be utilized in scenarios where content is streamed in one direction and where there is relatively limited interactivity between the consumer of the content and the sender of the content (e.g., adaptively streaming online videos from a video-sharing website, or adaptively streaming movies from a video streaming service providing access to a library of digital video content).

Interactive streaming techniques may be utilized in scenarios where there is a relatively high interactive relationship between the parties in a streaming session (e.g., cloud gaming, remote desktop control interfaces, or peer-to-peer video conferencing).

Embodiments of the present invention relate to interactive streaming of live content.

In an interactive streaming application, live content is generated (or received) at a sender and delivered across a network to a remote receiver for playback. The content generated may be an immediate outcome of the interaction between the sender and the receiver. To maintain high interactivity, the latency between content generation at the sender and content playback at the receiver should be kept at minimum.

At a particular framerate (e.g., 30 fps) and resolution, the coarseness or fineness of the compression of the content is reflected in the bitrate. A lower bitrate generally uses a coarser compression technique with more artifacts producing a less crisp image, and higher bitrate uses a finer compression technique with fewer artifacts and a clearer and sharper image.

The sender in a content streaming system may include three modules: a content generation module that in real-time creates or captures the content to be delivered; a compression module that constructs a compact representation of the content to reduce the network bandwidth required for delivery; and finally a streaming module that converts the compressed content into a sequence of packets and sends them over the network to the receiver.

The receiver may also include three modules: a streaming module that receives the network packets from the sender to reassemble the compressed content; a decompression module that reconstructs the content from the compressed form; and a presentation module that plays back the content.

For example, in the context of cloud gaming according to embodiments of the present invention, the content generation module at the sender captures game-play video frame-by-frame on a gaming server, the compression module further reduces the size of each captured video frame using a suitable video compression algorithm (such as H.264) operating at a target bitrate, and the streaming module finally converts each compressed frame into a block of packets and sends them to the receiver over a network socket or network communication channel. At the receiver, the streaming module assembles the incoming packets to recover the compressed frame, the decompression module reconstructs the video frame from the compressed data, and the presentation module renders the frame on the display.

Adaptive streaming, as opposed to interactive streaming, is a technique used in streaming applications that allows the receiver to dynamically switch the content representation being delivered from the server based on the network statistics and the receiver capabilities. In video streaming for instance, as a preprocessing step, video content may be compressed into multiple versions at different target bitrates.

During a streaming session, based on constant estimates of the instantaneous bandwidth available at the receiver, the receiver switches to the bitrate version that best fits the available bandwidth to maximize visual quality while preventing or reducing playback interruption.

In adaptive streaming applications, the receiver may not need to communicate a change in bitrate version to the server and simply retrieves a different stream generated at the different bitrate that is already being published from the server. For example, while streaming video from an online video streaming website that enables access to a library of pre-produced videos, if the bandwidth at the receiver drops, the receiver may switch to a lower-bitrate stream representing the same video content.

Thus, non-interactive streaming systems may be well-suited to address the use case of one-to-many content delivery. For example, the same content generated or stored at the sender may be played back by multiple receivers either simultaneously (e.g., live video broadcast), or at different periods of time (e.g., video on demand). Therefore, at the sender the content is always processed into different versions at different bitrates or qualities of service in general and made available to the receivers. Each receiver then dynamically retrieves the version that best fits its need.

However, interactive streaming systems may be better suited to one-on-one delivery, where the content is the result of the interaction between the sender and the receiver and the same content provided by the sender is only consumed by a single receiver. In this case, it may be a waste of computational resources for the sender to generate multiple versions of the same content at once, because only one version of the content is being accessed by the receiver at a time. Accordingly, a content streaming system according to embodiments of the present invention may efficiently enable a sender to output one version and wait for requests from the receiver to update the bitrate or other quality-of-service metrics.

Adaptive streaming techniques, by contrast, may not be well-suited to many interactive streaming applications. For example, in order to facilitate providing the receiver with the appropriate bitrate content according to the available bandwidth, adaptive streaming systems may utilize a playback buffer at the receiver, and monitor buffer occupancy (e.g., the amount of data stored in the playback buffer) to determine if the receiver can or should switch to a different bitrate version. A growing buffer indicates that the current bitrate version is lower than the available network bandwidth, and a depleting buffer indicates the opposite.

In contrast, in interactive streaming applications in order to reduce latency, the amount of playback buffering at the receiver should be low, or eliminated, such that content is played back as soon as it is available. Accordingly, in interactive streaming applications, buffer occupancy may not be a suitable indicator of the available bandwidth.

Additionally, adaptive streaming techniques may be more effective when a reliable communication interface exists between the sender and the receiver with Hypertext Transfer Protocol (HTTP) and Transmission Control Protocol (TCP) underneath. TCP generally facilitates data arriving at the destination correctly by means of packet retransmission. However, retransmission of data packets may introduce additional round-trip latency, and therefore may not be well-suited for interactive streaming applications.

User Datagram Protocol (UDP) may be a suitable alternative data communication protocol, however, but may result in additional data packet loss. Therefore, techniques designed for interactive streaming using UDP may need to take the potential packet loss into consideration.

Application-layer Forward Error Correction (FEC) is a method that may be used in interactive streaming applications to mitigate the effect of packet loss when the underlying transport protocol (e.g. UDP) does not provide reliable transmission. For example, at the sender, an FEC encoding system takes a block of k source symbols representing the content to be delivered, generates a total of n encoding symbols from the source symbols, and sends the n encoding symbols in n packets, together with auxiliary info in each packet, to the receiver. The Reed-Solomon family of codes that generates n-k repair symbols from the k source symbols to constitute the n encoding symbols is an example of such error-correcting code. At the receiver, as long as any k out of the n packets arrives correctly, the block of k source symbols, hence the corresponding content can be recovered fully. The method therefore adds protection against packet loss at the cost of having to send more data at the sender.

As discussed, embodiments of the present invention relate to an interactive streaming framework for streaming live content. Bandwidth estimation in this framework works with non-buffered, low-latency playback, and integrates with application-layer FEC to further improve error resiliency.

Embodiments of the present invention further operate to efficiently and adaptively deliver interactively-streamed live content, such as cloud gaming, remote desktop, or video conferencing, such that: bandwidth estimation will work with non-buffered low-latency playback; bandwidth availability can be estimated using techniques that are not reliant on buffered data; application layer FEC is utilized for improved error resiliency; requests for bitrate upgrades are tested by non-invasive probing of bandwidth without impacting content delivery; and Quality of Service monitoring in the adaptive streaming modules at both sender and receiver are used to regulate bitrate upgrades, fallbacks and downgrades, in such a way as to facilitate uninterrupted and continuous delivery of streaming content.

Embodiments of the present invention may include both sender and receiver software modules. The sender software modules may include a content generation module, a compression module, and a sender-streaming module. The receiver software modules may include a receiver-streaming module, a decompression module, and a presentation module.

At the sender the content generation module generates the content to be shared with the receiver. For example, in a cloud gaming system, the content generation module may include online gaming software running on a server.

The compression module at the sender compresses the content generated by the content generation module, at a resolution, framerate and bitrate requested by other components in the system. It then passes the compressed content to the sender-streaming module, which encodes the information as packets in a modified FEC block for transmission.

At the receiver, the receiver-streaming module reconstitutes the received packets into a modified FEC block and then passes the decoded block to the decompression module, the decompression module decompresses the content, and then passes the decompressed content to the presentation module. At the receiver, the presentation module receives decompressed content from the decompression module and presents the content to the user as well as collecting any interactive input from the user based on the content displayed.

According to embodiments of the present invention, the streaming module in a content streaming system, both at the sender and the receiver, provides support for adaptive streaming. At the sender, the streaming module takes k packets of data content or Application Data Units (ADUs) that represent the compressed content from the compression module, and processes the ADUs jointly with a modified application-layer Forward Error Correction (FEC) encoding scheme to generate an FEC block of n packets, including the k source packets and n-k repair packets, and sends them into a UDP socket. Note that parameter k and n may vary from block to block according to the design of the content streaming system.

An example of the ADUs that are processed jointly can be the H.264 Network Abstraction Layer (NAL) units that correspond to the same compressed video frame. The end of each FEC packet contains an identifier that includes the FEC block ID "b" (e.g., where $0<=b<256$), to indicate which FEC block the packet belongs to; the packet ID "i" (e.g., where $0<=i<k$ for source packets and $k<=i<n$ for repair packets); the number of source packets in the block "k"; and finally the total number of packets in the block "n". The inclusion of the parameter "n" may enable the receiver to discover if any packets in a block are lost and how many.

In one embodiment of the present invention, each of b, i, k, and n may be represented by a one-byte unsigned integer, resulting in a 4-byte identifier. In general, the required size of the parameters can vary according to the design of the content streaming system, depending on how frequently the FEC block IDs can be reused cyclically, and the maximum number of packets supported in an FEC block.

At the receiver, the streaming module inspects the identifier in every packet it receives, and keeps only the packets belonging to the last FEC block it has received based on parameter b. Parameters k and i in the identifier are also needed to properly set up the FEC decoding process. As soon as the number of received packets in this block is sufficient (i.e., at least k unique packets have been received); FEC decoding is applied to the block to recover the compressed content, which is then passed as ADUs to the decompression module.

If the number of received packets in the current block is never sufficient for a successful decode until any packet in the next block arrives, the remaining packets in the current block are assumed lost, and the corresponding compressed content is declared as damaged. The decompression module is then notified about the damaged content, and it is up to the implementation of the decompression module to decide how to respond to such an event.

To provide support for adaptive streaming, the streaming module at the receiver also may contain a Quality of Service (QoS) controller that, for each block, monitors the number of bytes and packets received and if the block experienced any packet loss, and requests the sender through a side channel to adjust the content bitrate accordingly. The sender can then update the target bitrate in the compression module, and also change the level of FEC protection in the streaming module (i.e., number of repair packets in each FEC block), and other parameters in the system such as video framerate and resolution.

Note that because the total number of packets in a block "n" is included in the packet identifier of all packets, if at least one packet in a block is received correctly, the receiver can recover parameter n of the block and eventually find out if any packet in the block is lost in transmission. For Quality of Service monitoring purposes, if there is any lost packet in an FEC block, even if enough packets are received for a successful FEC decode, the block is declared as an incomplete block. However even if there is packet loss if enough packets are received for a successful FEC decode, then the block is passed to the decompression module. If an entire block is lost, the receiver can still identify such an incomplete block by looking for gaps in the FEC block IDs it recently received.

In the QoS controller at the receiver, if incomplete blocks are frequently observed it is likely that the available bandwidth cannot sustain the current content bitrate. Frequent incomplete blocks can be defined and measured as, for example in one embodiment of the invention, that in a 2-second period an incomplete block is always observed within at most 0.5 seconds from the previous occurrence. In this case, the QoS controller estimates the available bandwidth based on the number of bytes correctly received during the 2-second period, and requests the sender to reduce the content bitrate accordingly.

If no incomplete block has been observed for a preset or predetermined period of time (e.g., in one embodiment of the invention, 10 seconds), the QoS controller concludes that the bandwidth currently available can at least sustain the current content bitrate reliably and requests the sender to upgrade the content bitrate to further improve the quality of service. Upon making the upgrade request, the QoS controller also starts a probation period of a preset or predetermined period of time (e.g., in one embodiment of the invention, 5 seconds), for this upgraded bitrate. If any packet loss, hence any incomplete block, is observed during the probation period, the upgraded bitrate may be excessive, and the QoS controller falls back to the original bitrate and informs the sender about the fallback. After a fallback, the QoS controller becomes more conservative and it makes sure no incomplete block is observed for a longer period of time (e.g., in one embodiment of the invention 20 seconds), before making the next upgrade request. This goes on if consecutive fallbacks are triggered until the observation period reaches a predefined maximum value (e.g., in one embodiment of the invention 160 seconds).

At the sender, upon receiving an upgrade request, instead of immediately increasing the target bitrate in the compression module to the requested amount, the sender generates probing packets in the sender-streaming module and sends them out together with existing source packets and repair packets in each FEC block.

The probing packets are used to increase the outgoing traffic to the receiver to the requested amount, without increasing the actual content bitrate, by first probing if the receiver indeed has enough bandwidth to sustain the upgraded bitrate.

According to embodiments of the present invention, the probing traffic is created not with dummy packets, but by generating additional repair packets and sending them over to the receiver. Accordingly, each additional new repair probing packet itself provides additional protection to the block against packet loss.

In the limited-bandwidth scenario, even if a new repair probing packet pushes out an existing packet, being an FEC repair packet itself, the probing packet contributes equally to the FEC decoding process, therefore minimizing or reducing any impact to the quality of service.

As described earlier, in situations where an incomplete block is observed in the QoS controller at the receiver during the probation period, a fallback request is issued to the sender. Upon receipt of the fallback request, the sender simply stops generating the probing traffic, thereby resuming the original content bitrate. If, instead, the sender never receives the fallback request during the probation period (e.g., a predetermined or set amount of time), the sender determines that the upgraded bitrate is sustainable at the receiver, and as a result upgrades the target bitrate in the compression module and stops generating probing traffic in the streaming module. This completes the upgrading process.

When using repair packets as the probing packets where the repair symbols are short, a large number of additional repair packets may be generated through the FEC encoding process to provide the required probing traffic, which may add additional computational burden on the sender.

Accordingly, in some embodiments of the present invention, the sender sends a small set of repair packets as probing packets repeatedly, and the receiver ignores or discards any repeated packet if a packet with the same packet ID "i" has already been received.

In some embodiments according to the present invention, the content streaming system utilizes extended repair packets. An extended repair packet is created by first generating a regular repair packet and extending the packet with filler bytes of all zeros (or all ones) to generate an extended repair packet having the maximum payload size of bytes for a UDP packet (e.g., 1472 bytes if sent over Ethernet). In some embodiments, the filler bytes, followed by a two-byte unsigned integer representing the size of the original packet excluding the packet identifier, are inserted right before the identifier. For example, if the original repair packet contains 600 bytes in the payload, including a 596-byte repair symbol and a 4-byte identifier, the 1472-byte extended repair packet would have the 596-byte repair symbol followed by 870 bytes of zeros (or ones), a two-byte unsigned integer representing the number 596, and the original 4-byte identifier. By limiting the size of each ADU such that the size of a repair symbol never reaches 1468 bytes, regular repair packets and the extended repair packets can be relatively easily differentiated at the receiver, and therefore the repair symbol in an extended repair packet can then be extracted.

When a repeated set of repair packets is utilized, the repeated repair packets may no longer bring additional protection against packet loss, while the extended repair packets in the latter solution might themselves be more susceptible to packet loss in general because of the larger size and can also push out more existing packets. Accordingly, in some embodiments, both repair packets and extended repair packets may be utilized to provide additional protection from data loss.

According to some embodiments of the present invention, the mix of new repair probing packets, repeated repair probing packets, and extended new repair probing packets that are used is dependent upon how much additional data is required to simulate a bandwidth based on the requested new bitrate. In some embodiments of the present invention, the content streaming system may first use only new repair probing packets. However, if in doing so it would either exhaust the number of packets possible in a block and or would not contribute enough to the increased data-load, then a hybrid mix of new repair probing packets, repeated repair probing packets and extended repair probing packets may be used, depending on the specifics of the data-load increase required and the packet number limitation.

Accordingly, embodiments of the present invention relate to a bandwidth estimation method that can be applied in a live streaming session while the content is being streamed, with minimal or relatively low impact to the quality of the streaming content. The bandwidth estimation method is incorporated into content streaming systems to provide support for adaptive streaming that adapts the quality of service in the system in real-time based on the available bandwidth at the receiver.

Alternative adaptive streaming techniques may assume the presence of a playback buffer and heavily rely on the observation of the buffer occupancy to estimate the available bandwidth, which may inhibit low-latency non-buffered playback in the context of streaming interactive content.

Alternative bandwidth estimation methods may not rely on playback buffers, but instead may send dummy probing traffic to test how much more traffic can the bandwidth support. However, if sent concurrently with the content, the additional dummy probing traffic can potentially push out packets that belong to the actual content traffic, which may impair the quality of the received content. Suspending streaming of the content while bandwidth estimation is being performed may cause interruption in content playback, which may reduce the quality of content deliver in the context of interactive streaming applications.

The bandwidth estimation method according to embodiments of the present invention facilitates bandwidth estimation and bitrate upgrade/downgrade without loss of content quality by sending additional FEC repairs packets as the probing traffic, concurrently or simultaneously (e.g., in a same block of packets) with the actual content. Embodiments of the present invention may not rely on playback buffers and may provide extra protection against packet loss, making it suitable for adaptive streaming of interactive content.

Figure 1:
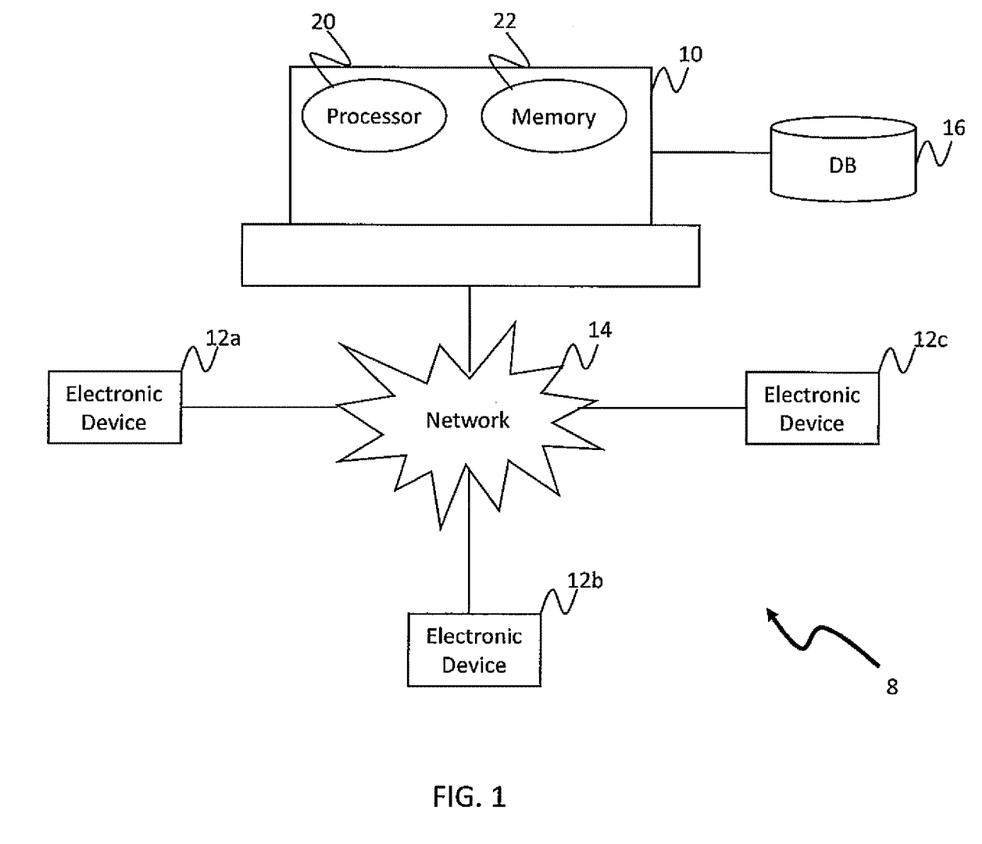
FIG. 1 illustrates an example block diagram of a plurality of electronic devices in electronic communication over a network in a content streaming system, according to some embodiments of the present invention.

Accordingly, embodiments of the present invention, provide an efficient solution for bandwidth estimation for interactive streaming of live content including: a bandwidth estimation method for live streaming that uses FEC repair packets as probing traffic sent concurrently with existing content traffic to minimize or reduce the impact on the quality of the streaming content; and system that incorporates the above bandwidth estimation method to enable adaptive streaming for low-latency non-buffered interactive streaming applications Referring to the figures, FIG. 1 is a schematic block diagram of content streaming system 8 according to some embodiments of the present invention. The content streaming system 8 includes a server 10 coupled to (i.e., in communication with) various end user electronic devices 12a-12c (collectively referred to as electronic devices 12) over a data communications network 14 such as, for example, a local area network or a wide area network (e.g., a public Internet). The server 10 includes one or more software modules for coordinating content delivery during a content streaming session between the electronic devices 12.

The server 10 is also coupled to a mass storage device or database 16 such as, for example, a disk drive, drive array, flash memory, magnetic tape, or other suitable mass storage device for storing information used by the server 10. For example, the mass storage device 16 may store profile information about each of the users operating the electronic devices 12, information about the electronic devices 12, as well as content to be delivered to the electronic devices 12 information related to a gaming session.

The server 10 further includes a processor or central processing unit (CPU) 20, which executes program instructions and interacts with other system components to perform various methods and operations according to embodiments of the present invention. The CPU 20 may include (or be in electronic communication with), for example, a graphics processing unit (GPU) for processing signals and data to display images on a display. The server 10 further includes a memory 22, which operates as an addressable memory unit for storing software instructions to be executed by the CPU 20. The memory 22 is implemented using any suitable memory device, such as a random access memory (RAM), and may additionally operate as a computer-readable storage medium having non-transitory computer readable instructions stored therein that when executed by a processor cause the processor to control the electronic devices 12 and interact with the server 10 in a content or data streaming environment.

According to one embodiment of the invention, the electronic devices 12 may connect to the data communications network 14 using a telephone connection, satellite connection, cable connection, radio frequency communication, or any suitable wired or wireless data communication mechanism. To this end, the electronic devices 12 may take the form of a personal computer (PC), hand-held personal computer (HPC), television and set-top-box combination, personal digital assistant (PDA), tablet or touch screen computer system, or any other suitable consumer electronics device.

Figure 2A:
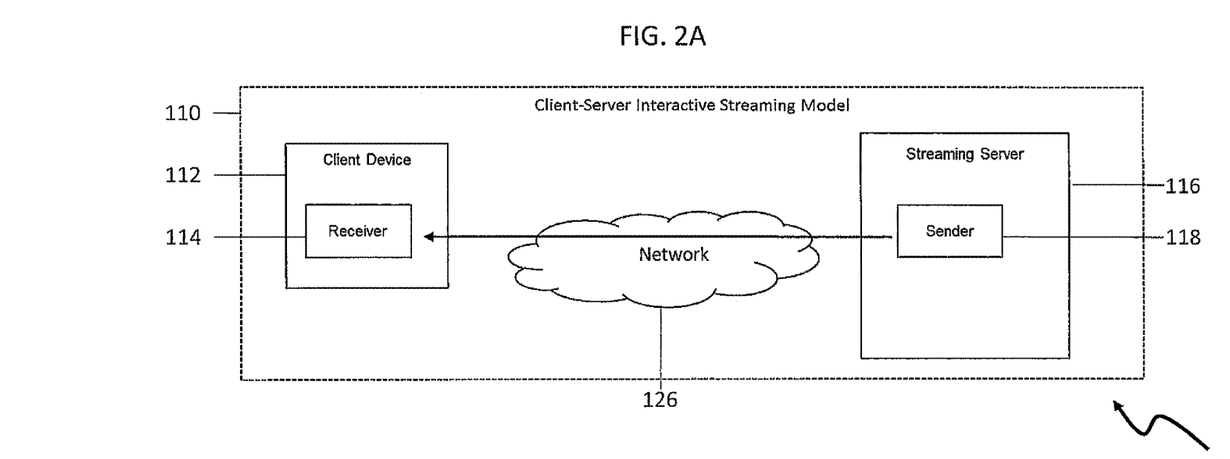
FIGS. 2A-2B illustrate models of a content streaming system, according to some embodiments of the present invention.
Figure 2B:
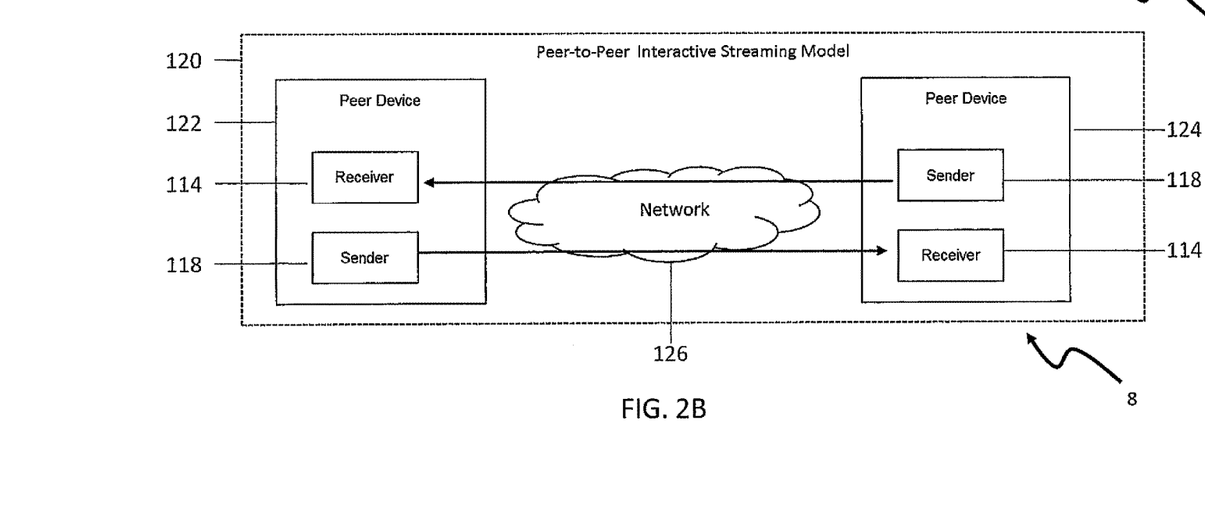

FIGS. 2A and 2B illustrate example block diagrams of the content streaming system 8 according to embodiments of the present invention.

Referring to FIG. 2A, the content streaming system 8 includes a client-server content streaming model 110. The client-server model 110 includes a streaming server 116 (e.g., the server 10 shown in FIG. 1) and a client device 112 (e.g., an electronic device 12 shown in FIG. 1). The streaming server 116 includes a sender 118 component for sending streaming content. The client device 112 includes a receiver 114 component for receiving streamed content.

Note that in the client-server content streaming model 110, while both the client device 112 and the server system 116 may send data to each other (such as user input etc.), only the streaming server 116 may stream content (e.g., live content).

Still referring to FIG. 2A, the content (e.g., live content) is streamed across a network 126 (e.g., the network 14 shown in FIG. 1). In one embodiment of the invention the network 126 is a wide area network (e.g., the Internet), and in another embodiment of the invention the network 126 is a local area network in a wired or wireless configuration (e.g., a Wi-Fi network). The network 126 may be any other suitable network configuration capable of enabling electronic communication between the streaming server 116 and the client device 112 (e.g., a satellite network, etc.).

Still referring to FIG. 2A, in one embodiment of the invention, the streaming server 116 is a cloud gaming server. In another embodiment of the invention the streaming server 116 is a desktop that streams the content of its desktop to a remote client device 112 for display and use in a remote desktop application.

Still referring to FIG. 2A, in one embodiment of the invention, the client device 112, is a personal computer. In another embodiment of the invention the client device 112 is a set-top box. In another embodiment of the invention the client device 112 is a mobile device, such as a smart phone. In another embodiment of the invention the client device 112 is a remote desktop device, etc.

Referring to FIG. 2B, according to embodiments of the present invention, another use for streaming (e.g., interactive streaming) of live content is illustrated by the peer-to-peer model 120. As illustrated in FIG. 2B, the peer-to-peer model 120 according to embodiments of the present invention, includes both peer devices 122 and 124 can play the role of sender 118 and receiver 114. Examples of the peer-to-peer model 120 include but are not limited to video conferencing, voice and video chat, remote desktop access, online multi-player gaming, etc. As in the client-server model 110, in the peer-to-peer model content is streamed and the peer devices 122 and 124 communicate across a network 126 (e.g., the network 14 in FIG. 1). Thus, one or both of the peer devices 122 and 124 may be electronic devices (e.g., electronic devices 12 in FIG. 1) operated by end-users of the content streaming system 8.

Figure 3:
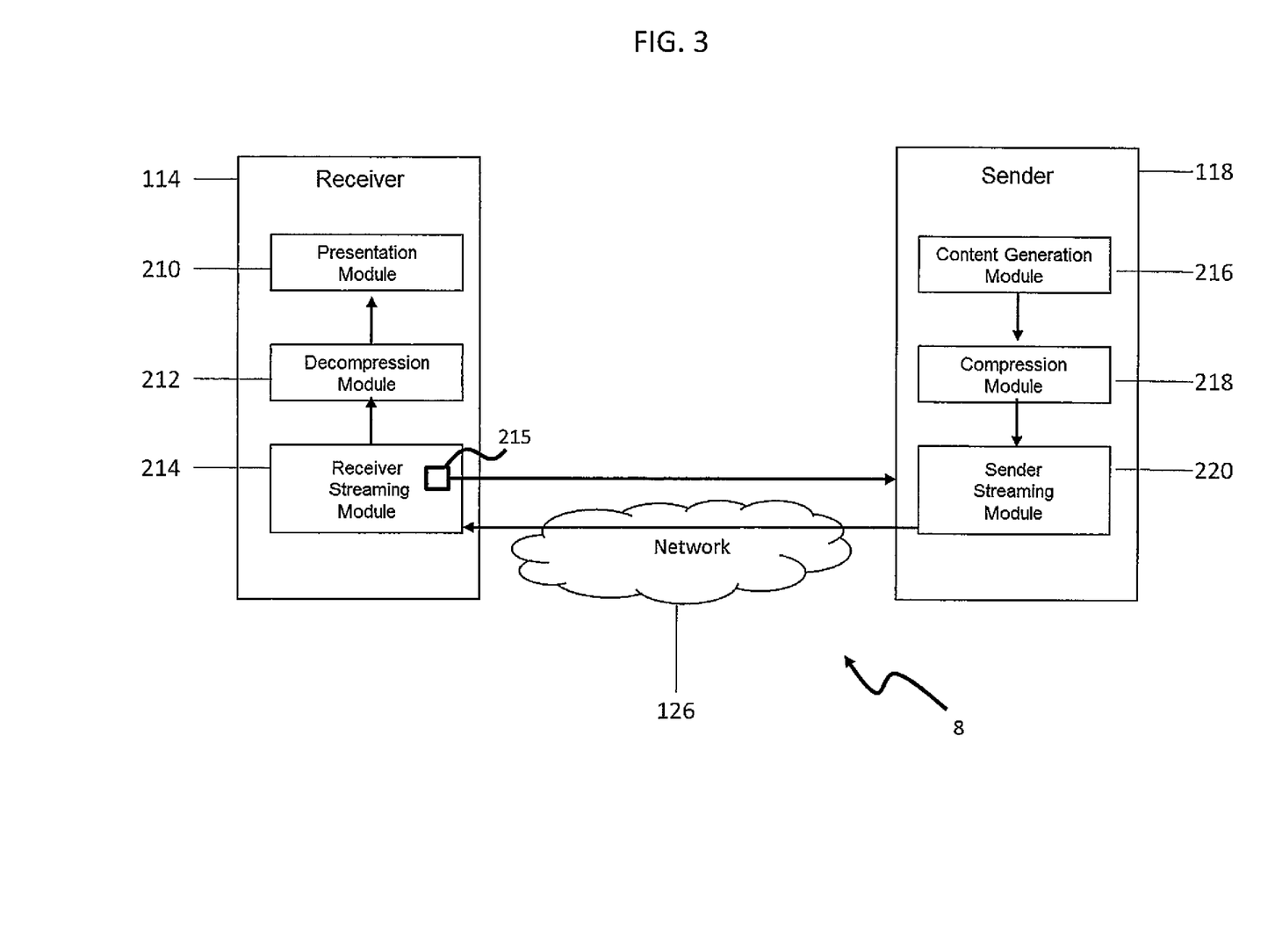
FIG. 3 illustrates an example block diagram of software modules for a sender and receiver in a content streaming system, according to embodiments of the present invention.

FIG. 3 illustrates further details of some of the modules used at both the sender 118 and receiver 114 for content or interactive streaming according to embodiments of the present invention.

Referring to FIG. 3 the sender 118 includes a content generation module 216, a compression module 218, and a sender-streaming module 220. The receiver 114 includes a presentation module 210, a decompression module 212, and a receiver-streaming module 214.

Still referring to FIG. 3, at the sender 118, the content generation module 216 generates (or receives from an external source) the content to be shared with the receiver 114. For example in one embodiment of the present invention, in a cloud gaming system, the content generation module 216 may be an online gaming system including software running on a server. The content generation module 216 at the sender 118 captures game-play video frame-by-frame on a gaming server.

Still referring to FIG. 3, at the sender 118, the compression module 218 compresses the content generated by the content generation module 216, at a resolution, framerate, and bitrate requested by other components in the system using a suitable compression process known to persons having ordinary skill in the art. The compression module 218 then passes the compressed content to the sender-streaming module 220 for transmission. In one embodiment of the present invention the compression module 218 reduces the size of each captured video frame using video compression algorithms such as H.264 operating at a target bitrate. It then packages the compressed video frame as a sequence of ADUs and passes the ADUs to the sender-streaming module 220.

Still referring to FIG. 3, at the sender 118, the sender-streaming module 220 takes the ADUs passed by the compression module 218 and, using Forward Error Correction (FEC) techniques, creates an FEC block including a sequence of source packets, which correspond to the ADUs, and a set of repair packets that can be used to reconstitute the block if any of the source packets are lost in transmission. During the probation period of a bitrate upgrade the sender-streaming module 220 also adds probing packets to the set of packets to be sent. The sender-streaming module 220 then sends each source packet, repair packet, and probing packet (if required) as an UDP-datagram over the network 126.

Still referring to FIG. 3, at the receiver 114, the receiver-streaming module 214 receives the UDP-datagrams, which include source packets, repair packets, and sometimes probing packets that were sent over the network 126. The receiver-streamer module 214, using FEC encoded information contained in each source packet, repair packet, and probing packet reconstitutes the FEC block, while also noting any packet loss for Quality of Service (QoS) monitoring using a QoS controller 215. After reconstituting the FEC block the receiver-streaming module 214 passes the reconstituted source packets as a set of ADUs to the decompression module 212.

Still referring to FIG. 3, the decompression module 212 takes the ADUs passed to it from the receiver-streamer module 214, and decompresses the ADUs to reconstitute a video frame. The decompression module 212 then passes the video frame to the presentation module 210 for display to the user.

Still referring to FIG. 3 embodiments of the present invention include the operations performed by both the sending-streaming module 220 and the receiver-streaming module 214.

Figure 4A:
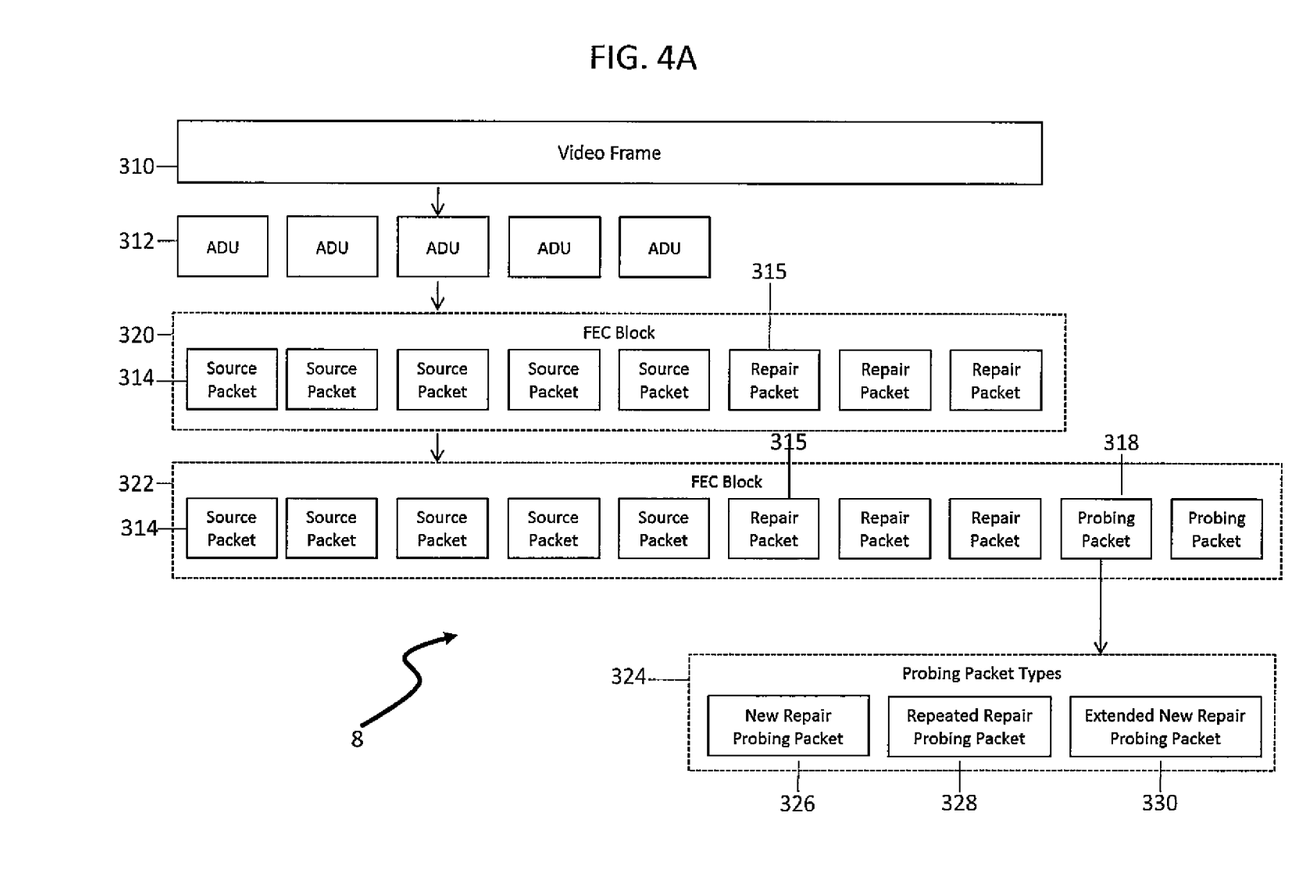
FIGS. 4A-4B illustrate a block diagram of a plurality of data packets generated by a sender in a content streaming system, according to embodiments of the present invention.
Figure 4B:
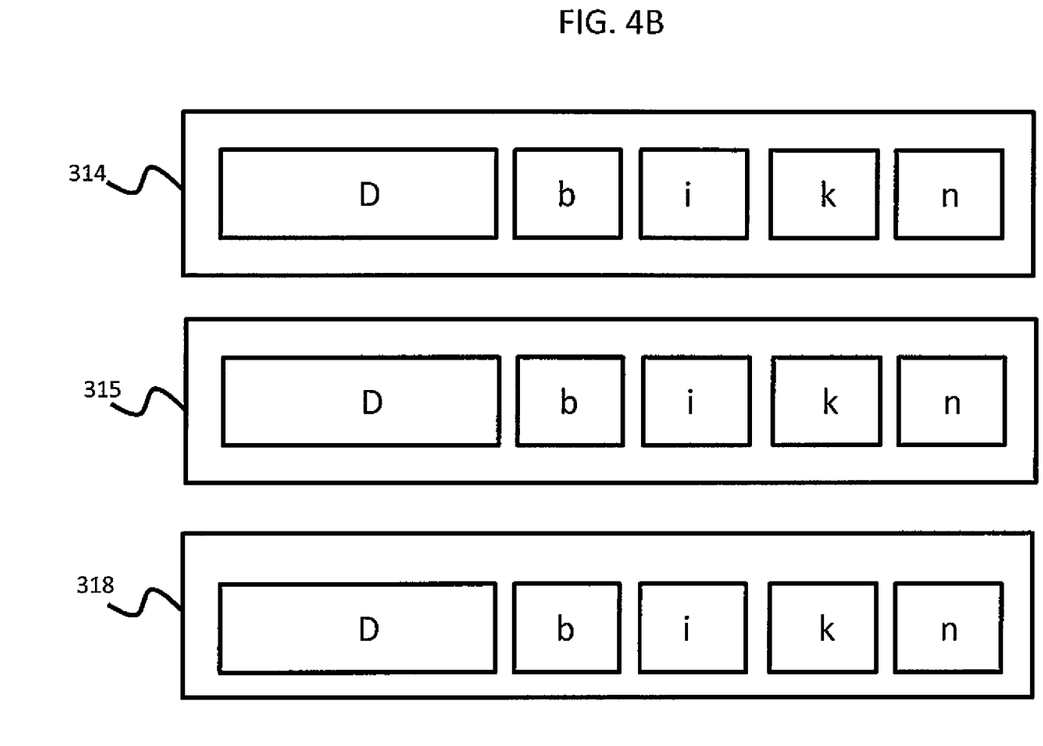

FIGS. 4A-4B illustrate a block diagram showing the relationship and mapping of some of the data transmitted in the content streaming system 8, including video frames, Application Data Units (ADUs) of FEC blocks, source packets, repair packets, and probing packets to each other according to embodiments of the present invention.

Referring to FIG. 4A, video frames (or other types of data content such as audio data) 310 are created or captured at the sender 118 by the content generation module 216 on a frame by frame basis and are ultimately consumed or displayed by the presentation module 210 at the receiver 114. At the sender 118, the content generation module 216 passes video frames 310 to the compression module 218 for compression before transmission.

At the sender 118, the compression module 218 creates ADUs (Application Data Units) 312 as after compressing a video frame 310. At the receiver 114, the streaming module 214 reconstructs the ADUs 312 from packets received in an FEC block 320, and then passes the ADUs 312 to the decompression module 212.

At the sender 118, the sender-streaming module 220 takes the ADUs 312 created by the compression module 218 and encodes them into an FEC block 320, including source packets 314 (corresponding to each ADU 312), repair packets 315, and when appropriate probing packets 318.

At the sender 118, the sender-streaming module 220 takes k ADUs 312 that collectively represent the compressed content from the compression module 218, and processes the ADUs 312 jointly with a modified application-layer FEC (Forward Error Correction) encoding scheme to generate an FEC block 320 of n packets, including k source packets 314 and n-k repair packets 315, and sends them into a UDP socket. The size of the parameters k and n may vary from block to block according to the functionality of the content streaming system 8 and the content being streamed. Additionally, when the sender-streaming module 118 is probing the network bandwidth to test if it can sustain a higher bitrate the FEC block will include source packets 314, repair packets 315, and probing packets 318.

According to the FEC encoding scheme, the ADUs 312 in the block can be successfully reconstituted at the receiver 118 by the receiver-streaming module 214 if the total number of source packets 314 and repair packets 315 (or in most cases probing packets 318) equals the total number of source packets 318 in the FEC block 320. As an example, if an FEC block 320 has 5, source packets 314 any combination of x source packets 314 and y repair packets 315 that combines to produce 5 packets (i.e., x+y≥5) can be used to reconstitute the ADUs 312 in the block.

An example of the ADUs 312 that are processed jointly can be the 11.264 NAL (Network Abstraction Layer) units that correspond to the same compressed video frame 310.

In addition to the data D held by each of the source packets 314, repair packets 315, and probing packets 318, as shown in FIG. 4B, each FEC packet (be it a source packet 314, repair packet 315, or probing packet 318) includes an identifier that includes the FEC block ID "b" e.g. $0<=b<256$, to indicate which FEC block 320 the packet belongs to; the packet ID "i" where $0<=i<k$ for source packets 314 and $k<=i<n$ for repair packets 315; the number of source packets 314 in the block "k"; and finally the total number of packets in the block "n". The inclusion of the parameter "n" may enable the receiver-streaming module 214 to discover if any packets in a block are lost and how many.

In one embodiment of the present invention, each of b, i, k, and n may be represented by a one-byte unsigned integer, resulting in a 4-byte identifier. In general, the required size of the parameters can vary according to the design and function of the content streaming system 8, for example, depending on how frequently the FEC block IDs can be reused cyclically and the maximum number of packets supported in an FEC block 320.

Referring again to FIG. 4A, probing packets 318 are used to increase the outgoing traffic to the receiver to the requested amount or at the requested bitrate, without increasing the actual content bitrate, to first probe if the receiver indeed has enough bandwidth to sustain the upgraded bitrate. Because the probing packets 318 include repair packet data, the probing packets 318 reduce potential harm to the data stream that could be caused by pushing out source or repair packets.

The probing packets 318 may include one or more of three different types of packets 324: (1) a new repair probing packet 326, (2) a repeated repair probing packet 328, and (3) an extended new repair probing packet 330 (extending a new repair packet with filler bytes).

Type 1 new repair probing packets 326 facilitate providing full protection against data loss, because every byte in the packet (except the 4-byte packet identifier) brings additional information to FEC decoding and can contribute to content recovery. That is, a new repair probing packet 326 may be as helpful for preserving content during transmission as a repair packet 315, because it brings additional protection to FEC block 320 recovery.

Type 2 repeated repair probing packets 328 may also provide partial protection, each of which repeat the data of one of the repair packets 315. If a repair packet 315 having the same data has arrived at the receiver 114 previously, the repeated repair probing packet 328 may operate solely as a filler packet because it does not provide any new information. However, if the repeated repair probing packet 328 is the first to arrive at the receiver 114, because all previous transmission of the same repair packet data is lost during transmission of the FEC block, the repeated repair probing packet 328 operates like a new repair packet 315 to provide the necessary repair data to facilitate content recovery according to the FEC encoding scheme. Therefore, in terms of content protection, a repeated repair probing packet 328 may provide less additional protection compared to sending new repair probing packets 318, but still may provide better protection than merely sending filler packets.

Type 3 extended new repair probing packets 330 also provides partial protection in a different way. Only part of an extended new repair probing packet 330 provides new information. It may be considered as sending a new repair packet 315 followed by a filler packet (e.g., all 0 s or all 1 s). Combining the two into a single packet has the benefits of reducing the total number of packets needed in a block as well as saving one packet identifier.

Still referring to FIG. 4A of the present invention, the mix of type 1, 2, and 3 repair packets 318 that are employed may be dependent upon how much additional data is required to simulate a bandwidth based on the requested new bitrate. For example, if using only type 1 new repair probing packets 326 would either exhaust the number of packets possible in a block and or would not contribute enough to the increased data-load, then a hybrid mix of type 1, 2, and 3 repair packets 318 may be used depending on the specifics of the data-load increase required and the packet number limitation.

Figure 5:
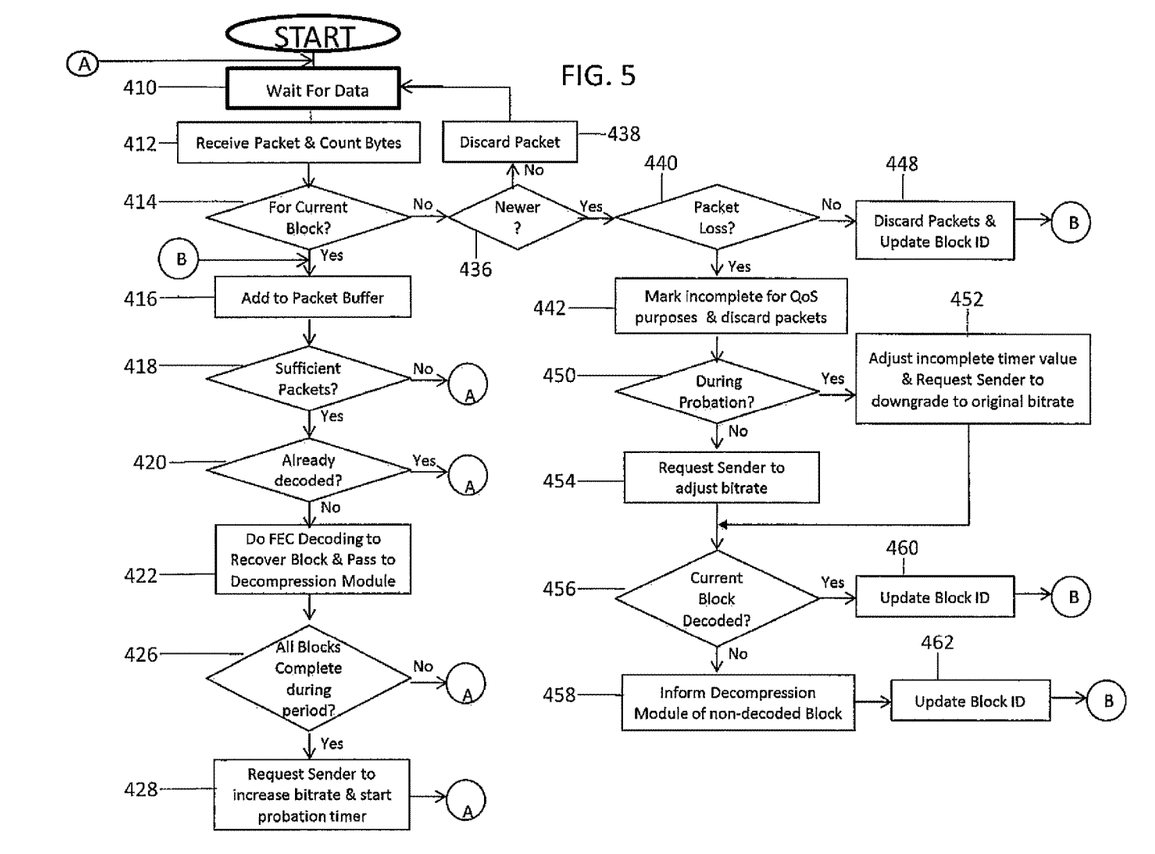
FIG. 5 illustrates a flow diagram of a process for receiving content from a sender and otherwise interacting with a sender in a content streaming system, according to embodiments of the present invention.

FIG. 5 is a flow diagram of a process taken at the receiver 114 by the receiver-streaming module 214 to receive packets, reconstruct FEC blocks 320, pass those blocks to the decompression module 212, as well as the QoS (Quality of Service) monitoring steps taken by the receiver-streaming module 214 that result in requests to the sender-streaming module 220 to either upgrade, downgrade, or fallback the content bitrate according to one embodiment of the present invention.

Starting from block 410, the receiver-streaming module 214, in block 412 receives packets from the underlying UDP datagram network software and counts the number of bytes received. In block 414, the receiver-streaming module 214 checks if the received packet is for the current FEC block 320, by checking the parameter FEC block ID parameter "b" in the FEC packet identifier of the received packet.

If the received packet is for the current FEC block 320, the receiver-streaming module 214 proceeds to block 416, where the received packet is added to the packet buffer. If the received packet is not for the current FEC block, the receiver-streaming module 214 proceeds to block 436.

Still referring to FIG. 4 of the present invention, according to one embodiment of the present invention, in block 416, the receiver-streaming module 214 adds the just received packet to the packet buffer for the currently active FEC block. At block 418, the receiver-streaming module 214 checks if sufficient packets have been received to decode the current FEC block. There are sufficient packets to decode an FEC block if any combination of source packets and unique repair packets equal the number of source packets in the FEC block (the number of source packets is denoted by the parameter "k" in the packet identifier of all packets). If sufficient packets have not been received, the receiver-streaming module 214 proceeds to block 410 to wait for the reception of the next packet. If sufficient packets have been received, the receiver-streaming module 214 proceeds to block 420. At block 420, the receiver-streaming module 214 checks if the current FEC block has already been decoded, and if so, the receiver-streaming module 214 proceeds to block 410 to wait for the next packet to be received. At block 422, if the current FEC block has not already been decoded, the receiver-streaming module 214 does FEC decoding to recover the block and passes the content as ADUs to the decompression module 212.

At block 426, the receiver-streaming module 214 checks if during a particular monitoring period all blocks have been received completely without any packet loss. If there was any packet loss, the receiver-streaming module 214 proceeds to block 410 to wait for the next received packet. If there was no packet loss for any blocks during the monitoring period it is an indication that the currently available bandwidth might be able to be upgraded and the receiver-streaming module goes to block 428, where the receiver-streaming module 214 requests the sender to increase the bitrate and starts a probation timer. The receiver-streaming module 214 then proceeds to block 410 to wait for the next incoming packet.

In one embodiment of the invention, at block 426, if no incomplete block has been observed for a set or predetermined period of time (e.g., 10 seconds), the receiver-streaming module 214 concludes that the bandwidth currently available can at least sustain the current content bitrate reliably and requests the sender to upgrade the content bitrate to further improve the quality of service. Upon making the upgrade request, the receiver-streaming module 214 also starts a set or predetermined probation period (e.g. in one embodiment of the invention 5 seconds). If any packet loss, hence any incomplete block, is observed during the probation period, the receiver-streaming module 214 determines that the upgraded bitrate is likely to be excessive, and the receiver-streaming module 214 falls back to the original bitrate and informs the sender about the fallback.

According to one embodiment of the invention, at block 414, if the received packet is found not to be for the current FEC block, the receiver-streaming module 214 proceeds to block 436. At block 436, the receiver-streaming module 214 checks if the packet received is for a newer FEC block. If the packet does not belong to a new block, then the packet belongs to an older FEC block and the packet is discarded and the receiver-streaming module 214 proceeds to block 410 to wait for the reception of the next packet.

At block 436, if it is determined that the packet received is for a newer FEC block 320, the receiver-streaming module 214 proceeds to block 440. At block 440, the receiver-streaming module 214 checks if there was any packet loss for the current block and therefore the block was incomplete. At block 448, if there was no packet loss for the current block, the receiver-streaming module 214 discards all packets in the packet buffer and updates the FEC Block ID and then proceeds to block 416, where the received packet is added to the packet buffer for the new FEC block 320.

At block 440, if it is determined that there was packet loss for the current block then the current block was incomplete and the receiver-streaming module 214 proceeds to block 442, where the receiver-streaming module 214 updates an incomplete block counter for QoS monitoring purposes and discards all packets for the incomplete block and then proceeds to block 450.

At block 450, the receiver-streaming module 214 checks if the probation period is active, and if it is, the receiver-streaming module 214 proceeds to block 452 where it, adjusts the timeout value for incomplete blocks used in block 426 and then informs the sender to downgrade to the original bitrate, and then the receiver-streaming module 214 proceeds to block 456. In one embodiment of the invention, after a fallback, the receiver-streaming module 214 becomes more conservative and it makes sure no incomplete block is observed for a longer period of time (e.g., in one embodiment of the invention, 20 seconds) before making the next upgrade request. This goes on if consecutive fallbacks are triggered until the observation period reaches a predefined maximum value (e.g., in one embodiment of the invention, 160 seconds). If at block 450 the receiver-streaming module 214 determines the probation period was not active, then the receiver-streaming module 214 proceeds to block 454 to request the sender to adjust the bitrate downward, and proceeds to block 456.

At block 456, in one embodiment of the present invention, the receiver-streaming module 214 checks if the current FEC block was decoded, and if so, the receiver-streaming module 214 proceeds to block 460, where the receiver-streaming module 214 updates the FEC block ID and then proceeds to block 416 where the receiver-streaming module 214 adds the packet to the packet buffer and continues with processing of the just received packet. If at block 456, the receiver-streaming module 214 determines that the current FEC block was not decoded, the receiver-streaming module 214 informs the decompression module 212 of a lost FEC block and then proceeds to block 462, where the receiver-streaming module 214 updates the FEC block ID, before proceeding to block 416 to continue with the processing of the just received packet.

Figure 6:
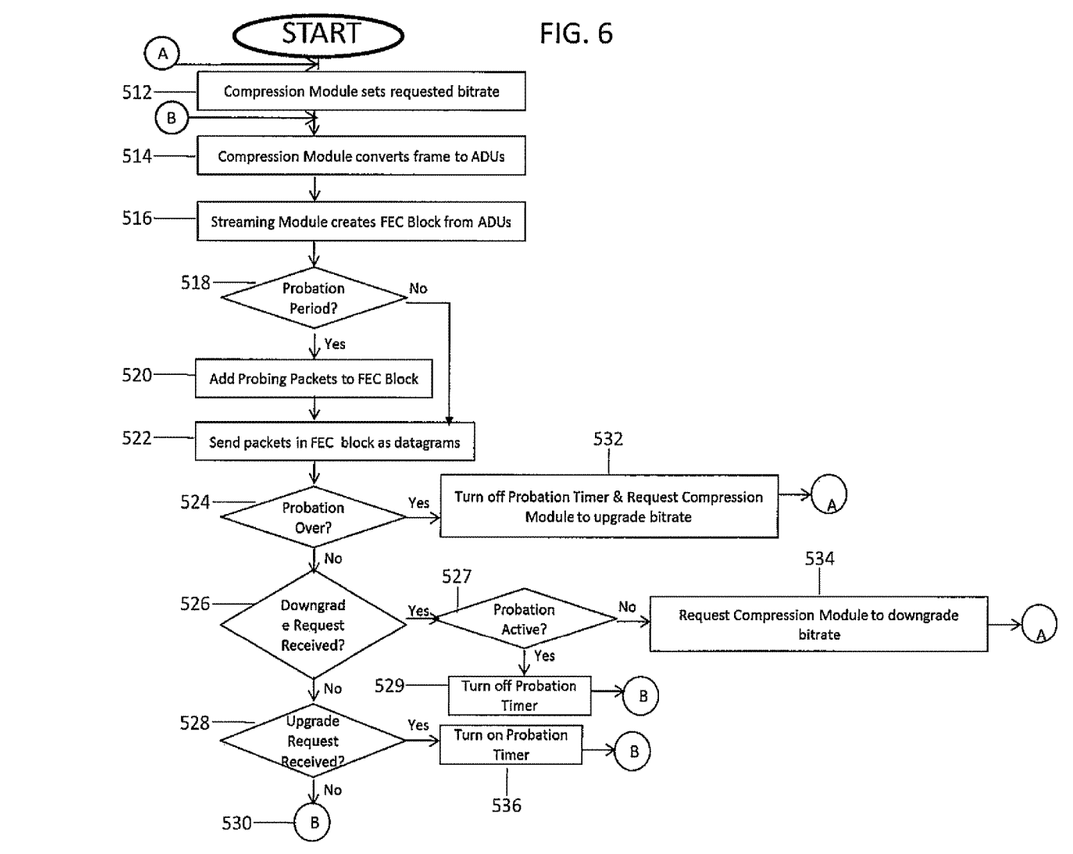
FIG. 6 illustrates a flow diagram of a process for generating and sending content to a receiver in a content streaming system, according to embodiments of the present invention.

FIG. 6 is a flow diagram of a process taken at the sender 118 by the sender-streaming module 220 to create Forward Error Correcting (FEC) Blocks from Application Data Units (ADUs) generated by the compression module 218, packetize those blocks, transmit them, add probing packets when appropriate, and take action on downgrade, fallback, and upgrade bitrate requests from the receiver 114 according to embodiments of the present invention.

Starting at block 512, the compression module 218 sets the requested bitrate for compression. At block 514, the compression module 218 compresses the current video frame at the currently requested bitrate and converts the video frame to ADUs and then passes the ADUs to the sender-streaming module 220.

At block 516, in one embodiment of the present invention, the sender-streaming module 220 creates an FEC block from the ADUs to produce an FEC block including source packets (corresponding to the ADUs) plus a unique set of repair packets. At block 518, the sender-streaming module 220, checks if there is a probation period currently active, and if not the sender-streaming module 220 then proceeds to block 522 to send the packets as UDP datagrams.

At block 520, if a probation period is currently active, the sender-streaming module 220 adds probing packets to the FEC block in order to simulate the bandwidth increase at the requested bitrate upgrade. The mix of probing packet types 324, that are used is some combination of new repair probing packets 326, repeated repair probing packets 328 and extended new repair probing packets 330 as previously discussed in the description of FIGS. 4A-4B. In one embodiment, the sender-streaming module 220 may use only new repair probing packets 326. However if in doing so it would either exhaust the number of packets possible in a FEC block or would not contribute enough to the increased data-load, then a hybrid mix of new repair probing packets 326, repeated repair probing packets 328, and extended new repair probing packets 330 may be used depending on the specifics of the data-load increase required and the packet number limitation.

At block 522, the sender-streaming module 220 sends all generated packets for the current FEC block (source packets, repair packets, and when appropriate probing packets) over the underlying network as UDP datagrams.

At block 524, the sender-streaming module 220 checks if the current probation period is over. If the probation period is over the sender-streaming module 220 turns off the probation timer and requests the compression module 218 to upgrade the bitrate and then proceeds to block 512. If the probation period is either not over or not active, the sender-streaming module 220 proceeds to block 526.

At block 526, the sender-streaming module 220 checks if any downgrade requests have been received from the receiver 114. If a downgrade request has been received, the sender-streaming module 220 proceeds to block 527, and if no downgrade request has been received it proceeds to block 528. At block 527, it checks if probation is active, and if so, the sender-streaming module 220 proceeds to block 529 where the sender-streaming module 220 turns off the probation timer and then proceeds to block 514. At block 527 if probation is not active, the sender-streaming module 220 proceeds to block 534, where the sender-streaming module 220 requests the compression module to downgrade the bitrate and proceeds to block 512.

At block 528, the sender-streaming module 220 checks if an upgrade request was received. If an upgrade request was received the sender-streaming module 220 proceeds to block 536, where the sender-streaming module 220 turns on the probation timer and then proceeds to block 514, to process the next set of ADUs from the compression module 218. If no upgrade request was received, the sender-streaming module 220 simply proceeds to block 514 to await the next set of ADUs from the compression module 218.

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A system for streaming data, the system comprising:
a processor;
a memory coupled to the processor, wherein the memory has stored thereon instructions that, when executed by the processor, cause the processor to:
encode a data stream at a first bitrate;

transmit a plurality of first data blocks to a receiver, each of the first data blocks comprising:
  a first source packet corresponding to the encoded data stream; and
  a first repair packet for reconstructing the encoded data stream in response to the first source packet being lost during transmission of a corresponding one of the first data blocks;
receive a bitrate upgrade request from the receiver; and
in response to the bitrate upgrade request, transmit a plurality of second data blocks to the receiver for a first predetermined period of time, each of the second data blocks comprising:
  a second source packet corresponding to the encoded data stream;
  a second repair packet for reconstructing the encoded data stream in response to the second source packet being lost during transmission of a corresponding one of the second data blocks; and
  a probing packet for reconstructing the encoded data stream in response to the second source packet being lost during transmission of the corresponding one of the second data blocks, wherein the probing packet comprises a third repair packet comprising repair data, different from repair data of the second repair packet, for reconstructing the encoded data stream in response to the second source packet being lost during transmission of the corresponding one of the second data blocks.

2. The system of claim 1, wherein the instructions further cause the processor to resume transmission of the first data blocks to the receiver in response to receiving a bitrate downgrade request from the receiver during the first predetermined period of time.

3. The system of claim 1, wherein the instructions further cause the processor to encode the data stream at a second bitrate in response to not receiving a bitrate downgrade request from the receiver during the first predetermined period of time.

4. The system of claim 3, wherein the instructions further cause the processor to transmit a plurality of third data blocks to the receiver, each of the third data blocks comprising a third source packet corresponding to the data stream encoded at the second bitrate.

5. The system of claim 1, wherein the probing packet comprises a repetition of repair data of the second repair packet.

6. The system of claim 1, wherein the third repair packet further comprises filler data appended to the repair data.

7. The system of claim 1, wherein the bitrate upgrade request is received when none of the source packets were lost during a second predetermined period of time.

8. The system of claim 2, wherein the bitrate downgrade request is received when one or more of the packets of the second data blocks was lost during a probation period.

9. A method for streaming data, the method comprising:
encoding, by a processor, a data stream at a first bitrate;
transmitting, by the processor, a plurality of first data blocks to a receiver, each of the first data blocks comprising:
  a first source packet corresponding to the encoded data stream; and
  a first repair packet for reconstructing the encoded data stream in response to the first source packet being lost during transmission of a corresponding one of the first data blocks;
receiving, by the processor, a bitrate upgrade request from the receiver; and
in response to receiving the bitrate upgrade request, transmitting, by the processor, a plurality of second data blocks to the receiver for a first predetermined period of time, each of the second data blocks comprising:
  a second source packet corresponding to the encoded data stream;
  a second repair packet for reconstructing the encoded data stream in response to the second source packet being lost during transmission of a corresponding one of the second data blocks; and
  a probing packet for reconstructing the encoded data stream in response to the second source packet being lost during transmission of the corresponding one of the second data blocks, wherein the probing packet comprises a third repair packet comprising repair data, different from repair data of the second repair packet, for reconstructing the encoded data stream in response to the second source packet being lost during transmission of the corresponding one of the second data blocks.

10. The method of claim 9, further comprising resuming transmission, by the processor, of the first data blocks to the receiver in response to receiving a bitrate downgrade request from the receiver during the first predetermined period of time.

11. The method of claim 9, further comprising encoding, by the processor, the data stream at a second bitrate greater than the first bitrate in response to not receiving a bitrate downgrade request from the receiver during the first predetermined period of time.

12. The method of claim 11, further comprising transmitting, by the processor, a plurality of third data blocks to the receiver, each of the third data blocks comprising a third source packet corresponding to the data stream encoded at the second bitrate.

13. The method of claim 9, wherein the probing packet comprises a repetition of repair data of the second repair packet.

14. The method of claim 9, wherein the third repair packet further comprises filler data appended to the repair data.

15. The method of claim 9, the bitrate upgrade request is received when none of the source packets were lost during a second predetermined period of time.

16. The method of claim 10 wherein the bitrate downgrade request is received when at least one of the packets of the second data blocks was lost during a probation period.

17. The method of claim 9, wherein the bitrate upgrade request includes a second bitrate greater than the first bitrate, and further comprising selecting an amount of probing data for a second data block according to the second bitrate.

18. The system of claim 1, wherein the bitrate upgrade request includes a second bitrate greater than the first bitrate, and wherein the instructions further cause the processor to select an amount of probing data for a second data block according to the second bitrate.

* * * * *

UNITED STATES PATENT AND TRADEMARK OFFICE
CERTIFICATE OF CORRECTION

| | |
|---|---|
| PATENT NO. | : 10,057,014 B2 |
| APPLICATION NO. | : 14/285489 |
| DATED | : August 21, 2018 |
| INVENTOR(S) | : Chang |

It is certified that error appears in the above-identified patent and that said Letters Patent is hereby corrected as shown below:

On the Title Page

Column 1, Item (54), in Title, Line 1-2, delete "SYSTEM AND METHOD FOR STREAMING DATA" and insert -- SYSTEMS AND METHODS FOR ADJUSTING BITRATES DURING INTERACTIVE STREAMING --, therefor.

In the Claims

In Column 19, Line 56, Claim 8, delete "blocks was" and insert -- blocks were --, therefor.

In Column 20, Line 50, Claim 16, delete "claim 10" and insert -- claim 10, --, therefor.

Signed and Sealed this
Twelfth Day of February, 2019

Andrei Iancu
*Director of the United States Patent and Trademark Office*